United States Patent
Zheng et al.

(10) Patent No.: US 8,150,119 B2
(45) Date of Patent: Apr. 3, 2012

(54) METHOD AND SYSTEM FOR LEFT VENTRICLE ENDOCARDIUM SURFACE SEGMENTATION USING CONSTRAINED OPTIMAL MESH SMOOTHING

(75) Inventors: Yefeng Zheng, Dayton, NJ (US); Bogdan Georgescu, Plainsboro, NJ (US); Michael Scheuering, Nuremberg (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 639 days.

(21) Appl. No.: 12/319,686

(22) Filed: Jan. 9, 2009

(65) Prior Publication Data
US 2009/0190811 A1 Jul. 30, 2009

Related U.S. Application Data

(60) Provisional application No. 61/023,212, filed on Jan. 24, 2008.

(51) Int. Cl.
*G06K 9/34* (2006.01)
*G06T 15/00* (2011.01)
(52) U.S. Cl. ......... 382/128; 382/171; 382/173; 345/419
(58) Field of Classification Search .................. None
See application file for complete search history.

(56) References Cited

U.S. PATENT DOCUMENTS

| | | | |
|---|---|---|---|
| 5,056,526 A | 10/1991 | Khalil | |
| 5,889,524 A * | 3/1999 | Sheehan et al. | 345/419 |
| 6,106,466 A * | 8/2000 | Sheehan et al. | 600/443 |
| 6,334,849 B1 | 1/2002 | Sunagawa | |
| 7,211,045 B2 | 5/2007 | Dala-Krishna et al. | |
| 7,286,875 B1 | 10/2007 | Park et al. | |
| 7,996,063 B2 * | 8/2011 | Vass et al. | 600/424 |
| 2005/0018890 A1 | 1/2005 | McDonald et al. | |

OTHER PUBLICATIONS

Li, Kang, et al., "Optimal Surface Segmentation in Volumetric Images—A Graph-Theoretic Approach", IEEE Trans. Pattern Anal. & Machine Intell., vol. 28, No. 1, Jan. 2006.

* cited by examiner

*Primary Examiner* — Vinh Nguyen (57) ABSTRACT

A method and system for left ventricle (LV) endocardium surface segmentation using constrained optimal mesh smoothing is disclosed. The LV endocardium surface in the 3D cardiac volume is initially segmented in a 3D cardiac volume, such as a CT volume, resulting in an LV endocardium surface mesh. A smoothed LV endocardium surface mesh is generated by smoothing the LV endocardium surface mesh using constrained optimal mesh smoothing. The constrained optimal mesh smoothing determines an optimal adjustment for each point on the LV endocardium surface mesh by minimizing an objective function based at least on a smoothness measure, subject to a constraint bounding the adjustment for each point. The adjustment for each point can be constrained to prevent adjustments inward toward the blood pool in order to ensure that the smoothed LV endocardium surface mesh encloses the entire blood pool.

20 Claims, 5 Drawing Sheets

METHOD AND SYSTEM FOR LEFT VENTRICLE ENDOCARDIUM SURFACE SEGMENTATION USING CONSTRAINED OPTIMAL MESH SMOOTHING

This application claims the benefit of U.S. Provisional Application No. 61/023,212, filed Jan. 24, 2008, the disclosure of which is herein incorporated by reference.

BACKGROUND OF THE INVENTION

The present invention relates to medical imaging of the heart, and more particularly, to left ventricle endocardium surface segmentation in medical images.

In many three-dimensional (3D) segmentation problems, it is often required to use a smooth surface mesh to represent the boundary of a segmented object. For example, in left ventricle (LV) endocardium surface segmentation, it is desirable to use a smooth mesh representing the LV endocardium surface to tightly enclose the whole blood pool. Such segmented smooth meshes can be used to extract many useful measures for diagnosis of the LV function, such as the volume, ejection fraction, and myocardium wall thickness. Mesh smoothing is also used in other applications, such as during mesh editing to convert an adjusted rough mesh into a smooth mesh.

In active contour based segmentation methods, smoothness is incorporated in the objective function. However, active contours use little prior knowledge regarding the object being segmented, and the contour often converges to an unrealistic shape. To mitigate this problem, an active shape model (ASM) is used to constrain the deformation of a shape. ASM is not formalized as an optimization problem, but an iterative process is exploited to deform the shape and enforce the shape constraint. During the deformation step, each point of the shape is moved along the normal direction to an optimal position based on certain criteria, such as gradient of the intensity or response of a learning based boundary detector. After this step, a zig-zag shape is achieved. The deformed shape is then projected into a principal components analysis (PCA) subspace, which is learned from training samples. Subspace projection enforces the constrained shape to be similar to the training shapes, and a smooth shape is often achieved using a low dimensional subspace. In K. Li, et al., "Optimal Surface Segmentation in Volumetric Images—A Graph-Theoretic Approach", *IEE Trans. Pattern Anal. Machine Intell.*, 28(1):119-134, 2006, another method to generate a smooth mesh during mesh deformation based on a graph cut method is proposed. During mesh deformation, a graph is generated, where only smoothing adjustment between neighboring points are allowed. This approach is embedded in a boundary evolution framework. Starting from a smooth mesh, this approach can adjust the boundary and evolve to result in a smooth mesh. However, given an unsmooth mesh, it is not clear how to extend the algorithm to generate a smooth mesh. Unlike the active contour based methods, both ASM and the graph cut based approaches do not explicitly enforce a smoothness measure.

Mesh smoothing can also be explicitly enforced independent of the segmentation algorithms. The simplest approach for smoothing a segmented mesh is the Lapalacian smoothing method, in which a new position for each vertex of the mesh is computed as a weighted average of the current position of the vertex, and its first order neighbors. This process is iterated to smooth the mesh. Typically, Lapalacian smoothing acts as a type of low pass filter, and therefore suffers from a shrinkage problem, in which when the smoothing method is applies iteratively a large number of times, a shape eventually collapses to a point. To alleviate the shrinkage problem, an iterative method consisting of two consecutive Lapalacian smoothing steps can be used. By tuning the parameters in Lapalacian smoothing, a more desirable transfer function of the low pass filter can be designed, for example, a transfer function having a flat passing band and a sharp transition from the passing band to the stop band.

The conventional approaches for mesh smoothing described above, when used in LV endocardium segmentation, do not meet the goal of achieving a smooth mesh that tightly encloses the whole blood pool. For example, the segmented mesh resulting from the conventional mesh smoothing may traverse the blood pool, such that the entire blood pool is not enclosed in the mesh.

BRIEF SUMMARY OF THE INVENTION

The present invention provides a method and system for left ventricle (LV) endocardium surface segmentation using constrained optimal mesh smoothing. Embodiments of the present invention utilize an optimization-based approach by maximizing an explicit mesh smoothness measure while enclosing the whole blood pool. Embodiments of the present invention utilize an objective function that is a strictly convex quadratic function with a unique global optimal solution.

In one embodiment of the present invention, an LV endocardium surface in the 3D cardiac volume is initially segmented in a 3D cardiac volume, such as a computed tomography (CT) volume, resulting in an LV endocardium surface mesh. A smoothed LV endocardium surface mesh is generated by smoothing the LV endocardium surface mesh using constrained optimal mesh smoothing. The constrained optimal mesh smoothing determines an optimal adjustment for each point on the LV endocardium surface mesh by minimizing an objective function based at least on a smoothness measure, subject to a constraint bounding the adjustment for each point. The adjustment for each point can be constrained to prevent adjustments inward toward the blood pool in order to ensure that the smoothed LV endocardium surface mesh encloses the entire blood pool.

These and other advantages of the invention will be apparent to those of ordinary skill in the art by reference to the following detailed description and the accompanying drawings.

DETAILED DESCRIPTION

The present invention is directed to a method for left ventricle (LV) endocardium surface segmentation using constrained optimal mesh smoothing in 3D medical images, such as computed tomography (CT) volumes, magnetic resonance images (MRI), and ultrasound images. Embodiments of the present invention are described herein to give a visual understanding of the LV endocardium segmentation method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Figure 1:
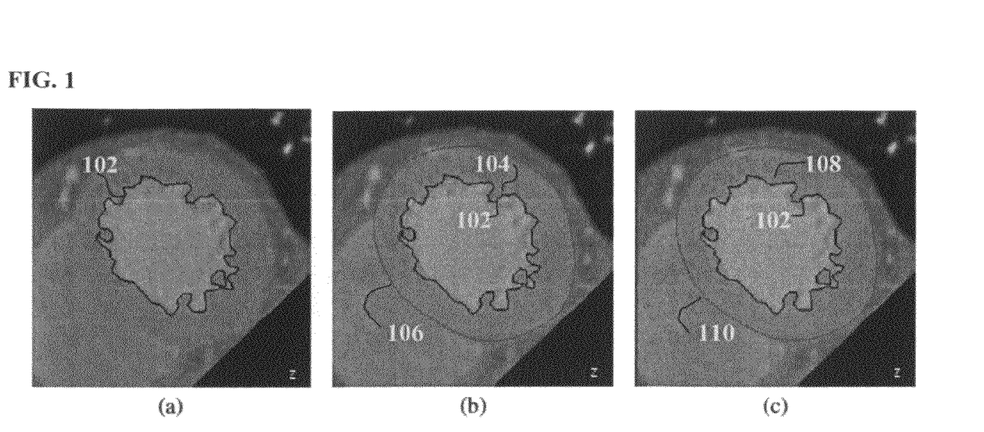
FIG. 1 illustrates exemplary LV segmentation.

Embodiments of the present invention segment the LV endocardium surface in medical images and result in a smoothed mesh that tightly encloses the whole LV blood pool. FIG. 1 illustrates exemplary LV segmentation. As illustrated in FIG. 1, image (a) shows the LV blood pool 102 in an exemplary CT volume. Image (b) shows endocardium surface 104 and the epicardium surface 106 segmentation results obtained by enforcing a shape constraint for smoothness (e.g., ASM). Image (c) shows endocardium surface 108 and the epicardium surface 110 segmentation results obtained using constrained optimal mesh smoothing according to an embodiment of the present invention. As shown in images (b) and (c) the endocardium surface 108 obtained using the shape constraint does not enclose all of the blood pool 102, and the endocardium surface 108 obtained using an embodiment of the present invention does enclose all of the blood pool 102.

Figure 2:
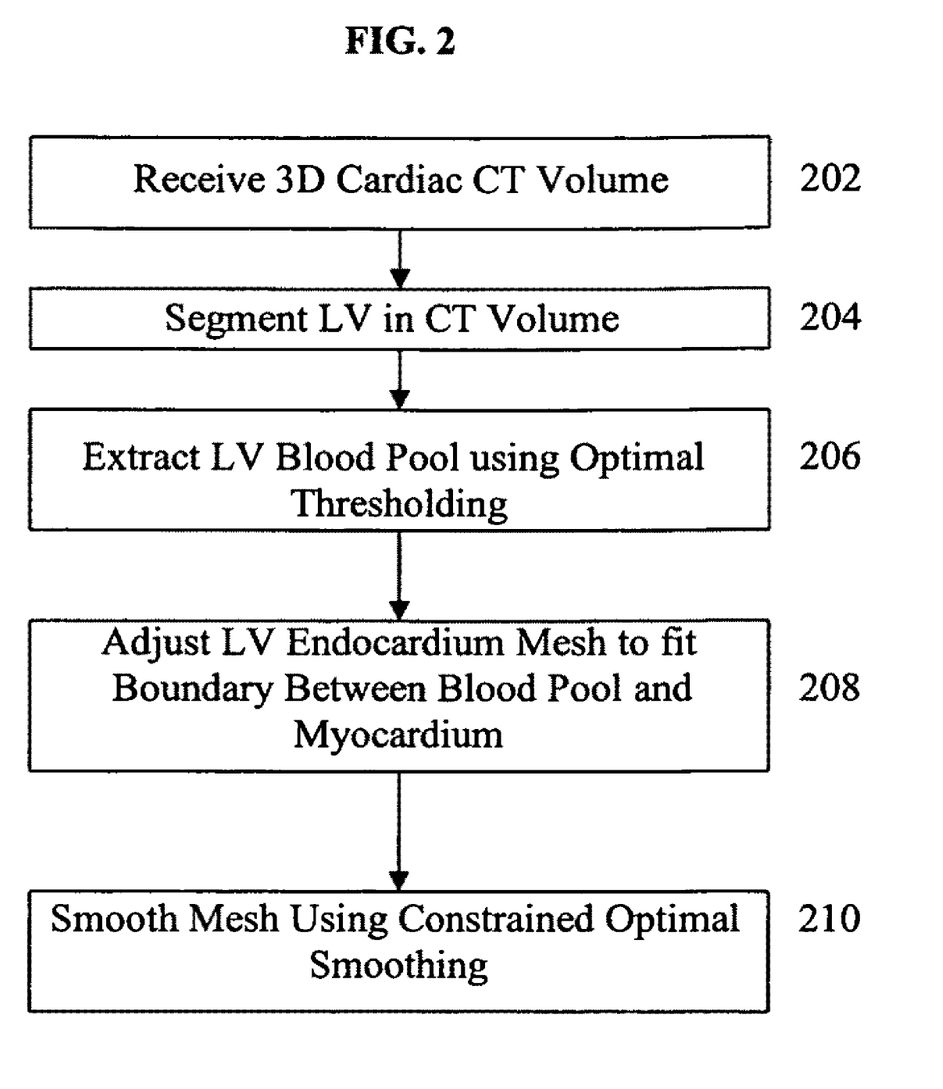
FIG. 2 illustrates a method for segmenting the LV endocardium surface using constrained optimal mesh smoothing in a 3D cardiac CT volume according to an embodiment of the present invention.

FIG. 2 illustrates a method for segmenting the LV endocardium surface using constrained optimal mesh smoothing in a 3D cardiac CT volume according to an embodiment of the present invention. As described herein, the method of FIG. 2 segments the LV endocardium surface in 3D cardiac CT volumes, but the present invention is not limited thereto. It is to be understood that the method of FIG. 2 can be similarly applied to other types of 3D cardiac volumes, such as cardiac MRI volumes, and cardiac ultrasound volumes. At step 202, a 3D cardiac CT volume is received. The CT volume can be received from a CT scanning device or can be a previously stored CT volume loaded from memory or storage of a computer system, or some other computer readable medium. The CT volume can be one of a dynamic CT volume sequence. It is to be understood that the method of FIG. 2 can be applied to a dynamic sequence of CT volumes by separately segmenting the LV endocardium surface for each CT volume in the CT volume sequence.

At step 204, the LV is segmented in the 3D cardiac CT volume to obtain an initial segmentation (mesh) of the LV endocardium surface and the LV epicardium surface. The LV can be segmented during a segmentation of all of the chambers of the heart. The chambers of the heart (LV, right ventricle (RV), left atrium (LA), and right atrium (RA)) can be segmented by generating a model, such as a surface mesh, of the heart chambers using marginal space learning (MSL). Such a model fitting approach can be based on exploiting a large database of annotated CT volumes to learn discriminative object models. This segmentation, or model fitting, can be formulated as a two-step learning problem: anatomical structure localization and boundary delineation. Such a method for MSL-based heart chamber segmentation is described in detail in U.S. Publication No. 2008/0101676, which is incorporated herein by reference.

Object localization is required for automatic segmentation, and discriminative learning approaches are efficient and robust for solving 2D object localization problems. MSL and steerable features are used to extend a learning based approach to 3D object detection. The idea of MSL is not to learn a classifier directly in a full similarity transformation parameter space, but to incrementally learn classifiers on projected sample distributions. As the dimensionality increases, the valid (positive) space region becomes more restricted by previous marginal space classifiers. In order to segment a heart chamber, such as the LV, the estimation of the similarity transformation (i.e., position, orientation, and scale) corresponding to the location of the chamber can be split into three problems: translation estimation, translation-orientation estimation, and full similarity transformation estimation.

In addition to reducing the size of the search space, another advantage of MSL is that it is possible to use different features or learning methods in each step or marginal space level. For example, in the translation estimation step, since rotation is treated as an intra-class variation, 3D Haar features can be used to train a classifier. In the translation-orientation and full similarity transformation estimation steps, steerable features can be used to train the classifiers. All of the classifiers can be trained as Probabilistic Boosting Trees (PBTs). Steerable features constitute a flexible framework, in which points from the CT volume are sampled under a special pattern. A number of local features, such as voxel intensity and gradient, are determined for each sampling point. To evaluate the steerable features under a particular orientation, the sampling pattern need only to be steered and no volume rotation is involved.

The first stage, or anatomical structure localization using MSL, results in position, orientation, and scale of each chamber. For each chamber, the mean shape of the chamber is then aligned with the estimated transformation to get a rough estimate of the chamber shape. This chamber shape is then deformed to fit the chamber boundary. Active shape models (ASM) are widely used to deform an initial estimate of a non-rigid shape under the guidance of image evidence and shape priori. However, a non-learning based boundary detector ASM may not work properly for boundary delineation of the heart chambers due to complex background and weak edges. Accordingly, a learning based method can be used to exploit more image evidence and achieve robust boundary detection.

The model resulting from step 204 can be a four-chamber model of the heart. The model at least includes segmentation of the LV including meshes representing the boundaries of the LV endocardium (inner wall) and the LV epicardium (outer wall).

Figure 3:
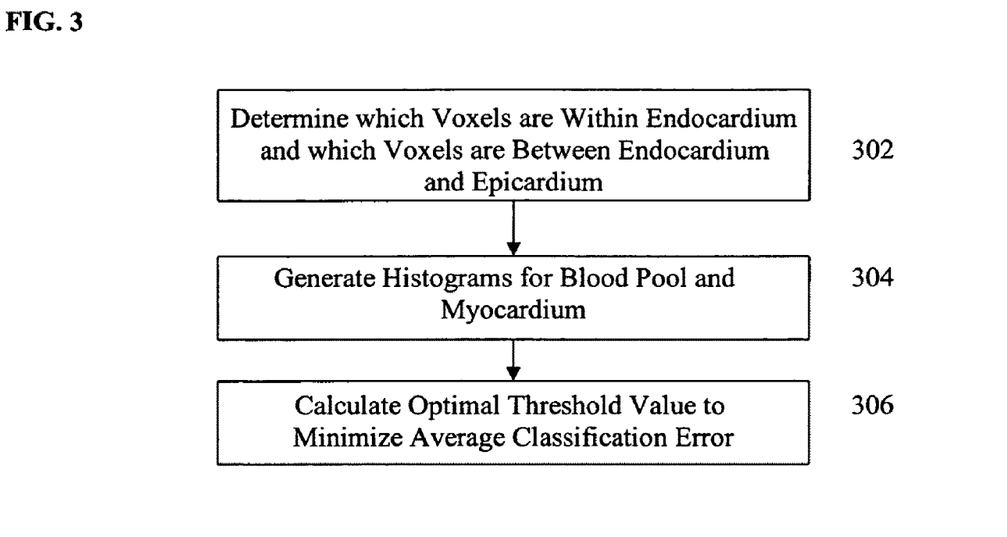
FIG. 3 illustrates a method for automatically calculating the optimal threshold value according to an embodiment of the present invention.

At step 206, the LV blood pool is extracted in the initial LV segmentation using optimal thresholding. In particular, an optimal threshold value is automatically determined based on the LV endocardium and LV epicardium segmented at step 204. FIG. 3 illustrates a method for automatically calculating the optimal threshold value according to an embodiment of the present invention. Accordingly, the method of FIG. 3 can be utilized to perform step 206 of the method of FIG. 2. Referring to FIG. 3, at step 302, it is determined which voxels are within (or enclosed by) the LV endocardium and which voxels are between the LV endocardium and the LV epicardium. Since both the LV endocardium and LV epicardium surface meshes are open with a hole at the mitral valve, a point can be added to each mesh at the center of the mitral valve and triangles can be added to each mesh to connect the mitral valve center point to the valve rim. This results in closed meshes for the endocardium and the epicardium. In principle, it can be determined if a voxel is enclosed by a closed surface by drawing a line extending from the voxel in an arbitrary direction to infinity. If the line intersects the surface an odd number of times, the voxel is inside the surface. Otherwise, the voxel is outside the surface. However, testing each LV voxel in this manner is time consuming and inefficient. Accordingly, the following more efficient implementation is used by embodiments of the present invention.

For each slice of the CT volume, the intersection of the LV endocardium mesh with the slice is determined. Since the endocardium mesh is closed, the intersection of the mesh with a slice results in a closed 2D contour on the slice. For each slice, the intersection of the 2D contour with each scan line on the slice is determined, resulting in a number of intersection points. For each scan line on a slice the voxels are scanned from left to right and labeled as inside the endocardium or outside the endocardium. Starting at the far left of a scan line, voxels are labeled as outside until a first intersection point is reached. After the first intersection point is reached, all voxels are labeled as inside until a next intersection point is reached. At each intersection point, the labeled is switched, and this process is continued until all voxels on the scan line are labeled. This same process can be repeated using the LV epicardium surface to label voxels as inside or outside of the epicardium. Voxels labeled as inside the endocardium and the epicardium are enclosed within the endocardium and are considered in the blood pool (note that the papillary muscles will be considered as the blood pool). Voxels labeled as outside the endocardium and inside the epicardium are between the endocardium and epicardium and are considered as the myocardium.

Figure 4:
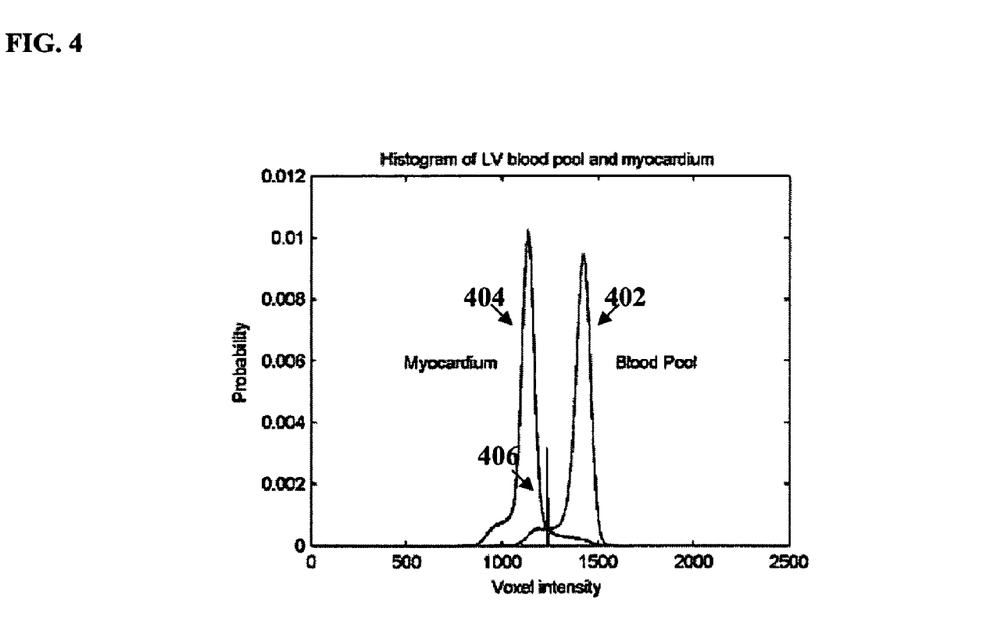
FIG. 4 illustrates exemplary histograms of voxel intensities generated for the blood pool and myocardium of the LV.

At step 304, histograms are generated for the blood pool and the myocardium based on the intensities of the voxels within the endocardium and the voxels between the endocardium and the epicardium, respectively. FIG. 4 illustrates exemplary histograms of voxel intensities generated for the blood pool and myocardium of the LV. As illustrated in FIG. 4, the blood pool histogram 402 and the myocardium histogram 404 are well separated, but slightly overlap in the middle. This is due to the papillary muscles being included in the blood pool histogram 402 and imperfections in endocardium surface segmentation and voxel labeling.

Returning to FIG. 3, at step 306, the optimal threshold value is determined based on the blood pool and myocardium histograms to minimize an average classification error. In other words, the optimal threshold value is determined based on the histograms to be a value that minimizes the number of blood pool voxels whose intensities are less than the value and the number of myocardium voxels whose intensities are greater than the value. As illustrated in FIG. 4, an optimal threshold value 406 is determined based on the blood pool and myocardium histograms 402 and 404. In the example of FIG. 4, the optimal threshold value 406 is determined to be 212.5 HU. Once the optimal threshold value is determined, the blood pool is extracted by detecting blood pool voxels based on the optimal threshold value. For example, voxels over the optimal threshold value can be labeled as blood pool voxels.

Returning to FIG. 2, at step 208 the initial LV endocardium mesh is adjusted to fit the boundary between the myocardium and the blood pool. Each mesh point is moved along the normal direction to fit the boundary between the blood pool and the myocardium determined using the optimal thresholding.

At step 210, the LV endocardium mesh is smoothed using constrained optimal smoothing in order to generate a smooth mesh representing the LV endocardium surface that tightly encloses the entire blood pool. The smoothness of a surface, S, can be measured by the sum of the squares of the derivative. Accordingly, a smoothness measure SM for the LV endocardium surface mesh S can be expressed as:

$$SM(S) = \int \|\nabla s\|^2 ds \quad (1)$$

A smaller SM represents a smoother surface. A discrete surface, such as a polyhedral surface, can be used to represent the boundary of a 3D object (such as the LV endocardium). A polyhedral surface is represented herein as S={V,F}, where V is an array of vertices and F is an array of faces. According to a possible implementation, triangulated surfaces, where all faces are triangles, can be used for the LV endocardium surface mesh. For each vertex $V_i$ (i.e., mesh point) on the surface, a neighborhood $N_i$ can be defined. For example, a first order neighborhood can be used, where vertex j is a neighbor of vertex i if they are on the same face. The smoothness around a vertex can be defined as:

$$\nabla V_i = \sum_{j \in N_i} w_{ij}(V_j - V_i), \quad (2)$$

where the weights $w_{ij}$ are positive numbers that add up to one for each vertex, $$\sum_{j \in N_i} w_{ij} = 1. \quad (3)$$

Thus, Equation (2) can be written as:

$$\nabla V_i = V_i - \sum_{j \in N_i} w_{ij} V_j. \quad (4)$$

In this form, the meaning of the smoothness measure is clear. A vertex on an extremely smooth surface (e.g., a plane) can be represented as a weighted average of its neighbors, thus having a smoothness $\nabla V_i$ of zero. The weights can be chosen in a variety of ways taking into account considerations of the neighborhoods. It is possible to assume that the weights are constant for all vertices. According to an advantageous embodiment, the weights can be set uniformly, such that:

$$w_{ij} = \frac{1}{\#N_i}, \quad (5)$$

where $\#N_i$ is the number of neighborhoods for vertex i. Given Equation (2), the smoothness of the whole surface, S, can be expressed as:

$$SM(S) = \sum_i \|\nabla V_i\|^2. \quad (6)$$

Accordingly, a smooth surface is generated by minimizing the smoothness measure of the surface expressed in Equation (6). However, because there is too much freedom to adjust the mesh, the adjustment is constrained to only allow adjustment along the normal direction. This constraint is expressed as:

$$V_i' = V_i + \delta_i N_i, \quad (7)$$

where $\delta_i$ is a scalar and $N_i$ is the surface normal at vertex i. The adjustment of each vertex can be further limited by enforcing the following constraint:

$$l_i \leq \delta_i \leq u_i, \quad (8)$$

where $l_i$ and $u_i$ are lower and upper bounds of the adjustment for vertex i. For example, in LV endocardium segmentation, $\delta_i \geq 0$ can be enforced in order to only allow the LV endocardium surface mesh to be adjusted outward, thus ensuring that the smoothed mesh encloses the entire blood pool.

In addition to the constraints of Equations (7) and (8), it is also advantageous to control a trade-off between smoothness and the amount of the adjustment. This is taken into account by the second term of the objective function of Equation (9) below. The final optimization problem to smooth the LV endocardium surface mesh is to solve the objective function:

$$\min F = \sum_i \left\| \sum_{j \in N_i} w_{ij}(V'_j - V'_i) \right\|^2 + \alpha \sum_i \delta_i^2, \qquad (9)$$

subject to the bound constraint of Equation (8). In Equation (9), $\alpha \geq 0$ is a scalar. Thus, the second term of the objective function acts as a penalty for large adjustments, in order to smooth the LV endocardium surface mesh using as small adjustments as possible.

In order to smooth the LV endocardium surface mesh resulting from step 208, the objective function of Equation (9) is solved subject to the bound constraint of Equation (8), in order to adjust each mesh point (vertex) on the LV endocardium surface mesh. This results in a smoothed LV endocardium surface mesh representing the LV endocardium surface in the 3D CT volume. By setting the bound constraint of Equation (8) such that $\delta_i \geq 0$, the smoothed LV endocardium surface mesh can only be adjust outward, and thus will enclose the entire blood pool.

The optimization problem of Equation (9) is a classical quadratic programming problem. For $\alpha \geq 0$ the objective function of Equation (9) is a convex function. For $\alpha > 0$, the objective function is a strictly convex function, thus having a unique global optimal solution. There are many well-known algorithms for solving such a quadratic programming problem, and with the bound constraint of Equation (8), more efficient and specialized solutions can be used to solve a bounded quadratic programming problem. Such techniques are well known to those skilled in the art.

The smoothed mesh can be output, for example, by displaying the smoothed mesh on a display device of the computer system performing the method steps of FIG. 2. The smoothed mesh can also be output by storing the smoothed mesh in a memory or storage of the computer system or a computer readable medium.

Figure 5:
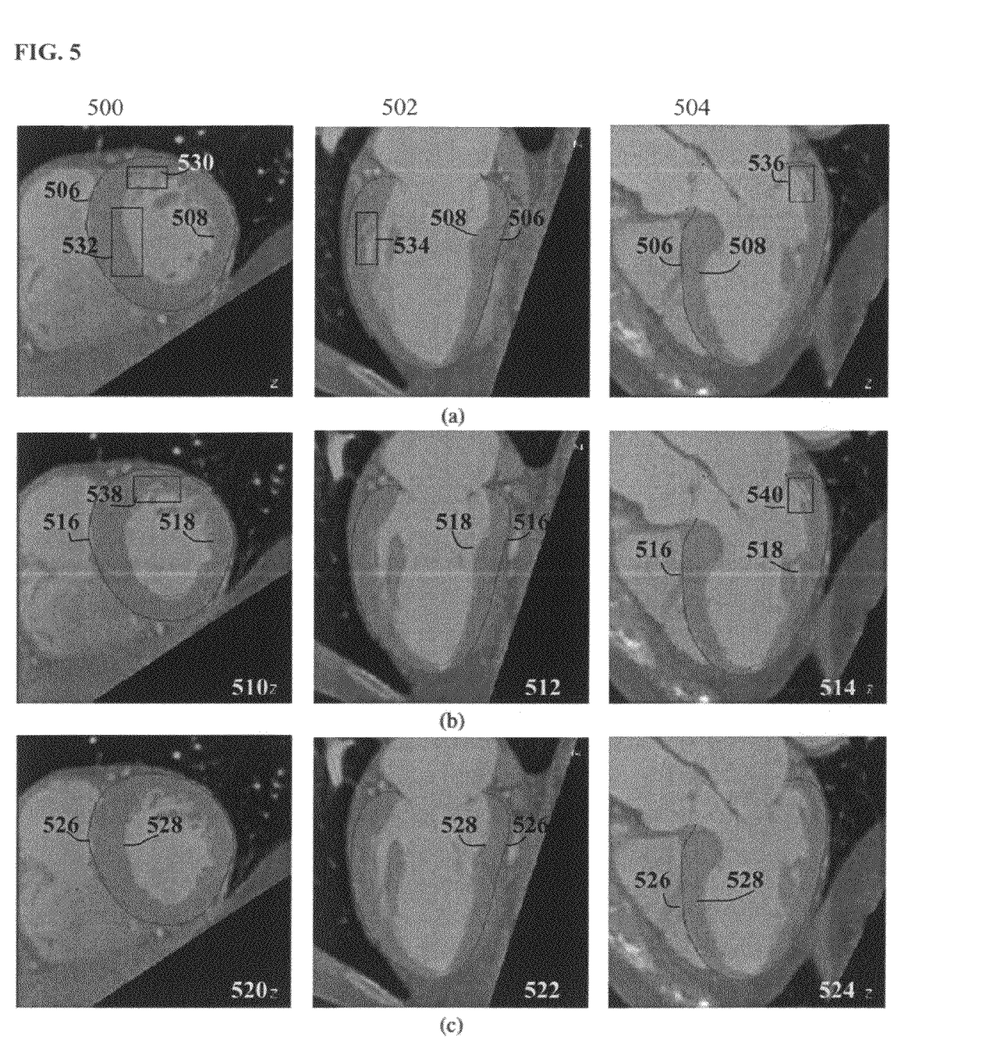
FIG. 5 illustrates exemplary segmentation results using the LV endocardium segmentation method of FIG. 2.

FIG. 5 illustrates exemplary segmentation results using the LV endocardium segmentation method of FIG. 2. As illustrated in FIG. 5, row (a) shows orthogonal views 500, 502, and 504 of LV segmentation results obtained by enforcing a shape constraint. In particular, images 500, 502, and 504, show the epicardium surface 506 and the endocardium surface 508 segmented by enforcing the shape constraint (e.g., ASM). Row (b) shows orthogonal views 510, 512, and 514 of LV segmentation results obtained using generic mesh smoothing (e.g., Lapalacian smoothing). In particular, images 510, 512, and 514, show the segmented epicardium surface 516 and the endocardium surface 518. Row (c) shows orthogonal views 520, 522, and 524 of LV segmentation results obtained using the constrained optimal mesh smoothing according to an embodiment of the present invention. In particular, images 520, 522, and 524, show the epicardium surface 526 and the endocardium surface 528 segmented using the method of FIG. 2. Accordingly, the endocardium surface 526 is a smoothed surface mesh resulting from the method of FIG. 2. As shown in rows (a) and (b) FIG. 5, regions 230, 232, 234, 236, 238, and 240 are regions in which the endocardium surfaces 508 and 518 generated using the conventional techniques do not fully enclose the blood pool. As shown in row (c), the smoothed endocardium surface mesh 528 generated using constrained optimal mesh smoothing fully encloses the blood pool in these regions.

Figure 6:
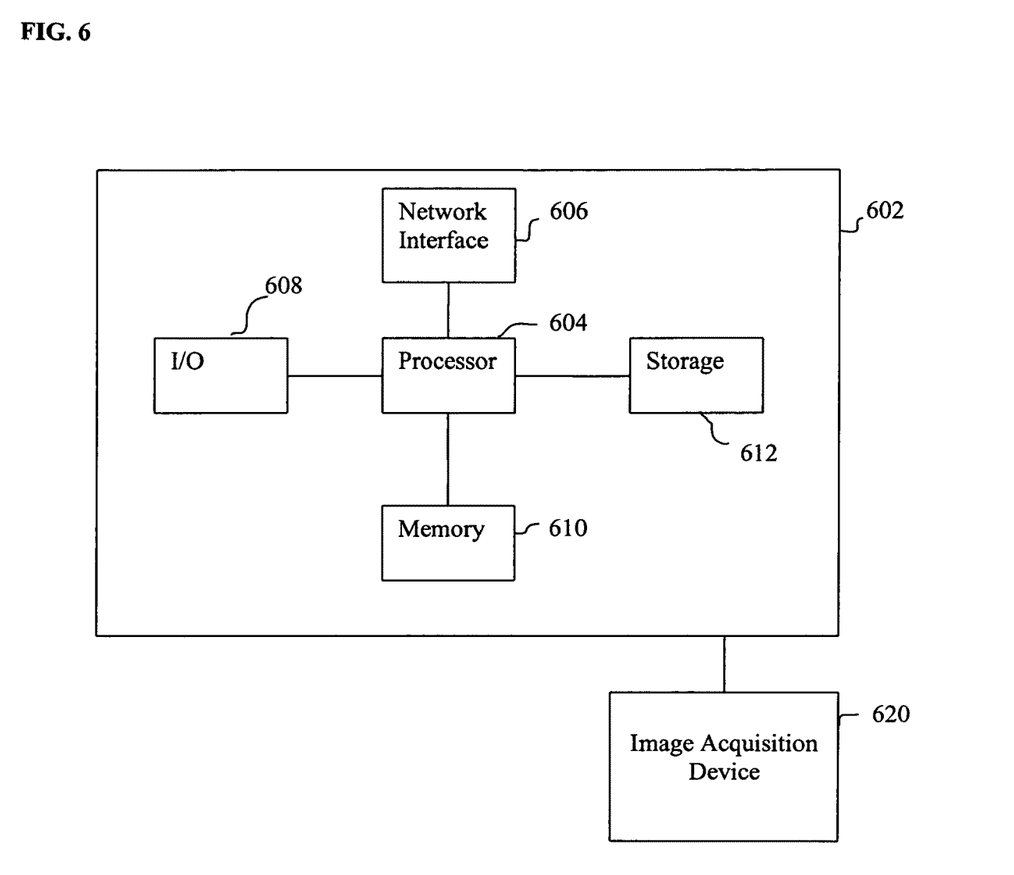
FIG. 6 is a high level block diagram of a computer capable of implementing the present invention.

The above-described methods for constrained optimal mesh smoothing and LV endocardium surface segmentation may be implemented on a computer using well-known computer processors, memory units, storage devices, computer software, and other components. A high level block diagram of such a computer is illustrated in FIG. 6. Computer 602 contains a processor 604 which controls the overall operation of the computer 602 by executing computer program instructions which define such operation. The computer program instructions may be stored in a storage device 612, or other computer readable medium (e.g., magnetic disk, CD ROM, etc.) and loaded into memory 610 when execution of the computer program instructions is desired. Thus, the steps of the methods of FIGS. 2 and 3 may be defined by the computer program instructions stored in the memory 610 and/or storage 612 and controlled by the processor 604 executing the computer program instructions. An image acquisition device 620, such as a CT scanning device, can be connected to the computer 602 to input the 3D volumes to the computer 602. It is possible to implement the image acquisition device 620 and the computer 602 as one device. It is also possible that the image acquisition device 620 and the computer 602 communicate wirelessly through a network. The computer 602 also includes one or more network interfaces 606 for communicating with other devices via a network. The computer 602 also includes other input/output devices 608 that enable user interaction with the computer 602 (e.g., display, keyboard, mouse, speakers, buttons, etc.). Such input/output devices 608 may be used in conjunction with a set of computer programs as an annotation tool to annotate volumes received from the image acquisition device 620. One skilled in the art will recognize that an implementation of an actual computer could contain other components as well, and that FIG. 6 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for segmenting a left ventricle (LV) endocardium surface in a 3D cardiac volume, comprising:
   generating a mesh representing the LV endocardium surface in the 3D cardiac volume; and
   generating a smoothed mesh by smoothing the mesh by determining an optimal adjustment for each point on the mesh based on a smoothness measure of the mesh and a constraint bounding the adjustment for each point.

2. The method of claim 1, wherein said step of generating a mesh representing the LV endocardium surface comprises:
   segmenting at least an initial LV endocardium surface and an LV epicardium surface in the 3D cardiac volume;

extracting an LV blood pool based on an optimal threshold determined based on intensities of voxels within the initial LV endocardium surface and voxels between the initial LV endocardium surface and the LV epicardium surface; and adjusting the initial LV endocardium surface to fit a boundary of the LV blood pool.

3. The method of claim 2, wherein said step of segmenting at least an initial LV endocardium surface and an LV epicardium surface comprises:

generating surface meshes of the LV endocardium and the LV epicardium using marginal space learning.

4. The method of claim 2, wherein said step of extracting an LV blood pool based on an optimal threshold determined based on intensities of voxels within the initial LV endocardium surface and voxels between the initial LV endocardium surface and the LV epicardium surface comprises:

determining which voxels in the 3D cardiac volume are within the LV endocardium and which voxels in the 3D cardiac volume are between the LV endocardium and the LV epicardium;

generating histograms of the intensities of the voxels within the LV endocardium and the intensities of the voxels between the LV endocardium and the LV epicardium;

calculating the optimal threshold value based on the histogram to minimize an average classification error; and labeling blood pool voxels based on the optimal threshold.

5. The method of claim 1, wherein the constraint bounding the adjustment for each point prevents the optimal adjustment for each point of the mesh from being inward towards the blood pool.

6. The method of claim 1, wherein determining an optimal adjustment for each point on the mesh based on a smoothness measure of the mesh and a constraint bounding the adjustment for each point comprises:

minimizing an objective function based at least on the smoothness measure of the mesh subject to the constraint bounding the adjustment for each point.

7. The method of claim 6, wherein the objective function comprises a first term representing the smoothness measure and a second term that penalizes large adjustments.

8. The method of claim 1, wherein the optimal adjustment is constrained to be in a normal direction to the mesh.

9. An apparatus for segmenting a left ventricle (LV) endocardium surface in a 3D cardiac volume, comprising:

means for generating a mesh representing the LV endocardium surface in the 3D cardiac volume; and means for generating a smoothed mesh by smoothing the mesh using constrained optimal mesh smoothing, said means for generating a smoothed mesh comprising:

means for determining an optimal adjustment for each point on the mesh based on a smoothness measure of the mesh and a constraint bounding the adjustment for each point.

10. The apparatus of claim 9, wherein said means for generating a mesh representing the LV endocardium surface comprises:

means for segmenting at least an initial LV endocardium surface and an LV epicardium surface in the 3D cardiac volume;

means for extracting an LV blood pool based on an optimal threshold determined based on intensities of voxels within the initial LV endocardium surface and voxels between the initial LV endocardium surface and the LV epicardium surface; and means for adjusting the initial LV endocardium surface to fit a boundary of the LV blood pool.

11. The apparatus of claim 9, wherein the constraint bounding the adjustment for each point prevents the optimal adjustment for each point of the mesh from being inward towards the blood pool.

12. The apparatus of claim 9, wherein said means for determining an optimal adjustment for each point on the mesh based on a smoothness measure of the mesh and a constraint bounding the adjustment for each point comprises:

means for minimizing an objective function based at least on the smoothness measure of the mesh subject to the constraint bounding the adjustment for each point.

13. The apparatus of claim 12, wherein the objective function comprises a first term representing the smoothness measure and a second term that penalizes large adjustments.

14. The apparatus of claim 9, wherein the optimal adjustment is constrained to be in a normal direction to the mesh.

15. A non-transitory computer readable medium encoded with computer executable instructions for segmenting a left ventricle (LV) endocardium surface in a 3D cardiac volume, the computer executable instructions defining steps comprising:

generating a mesh representing the LV endocardium surface in the 3D cardiac volume; and generating a smoothed mesh by smoothing the mesh by determining an optimal adjustment for each point on the mesh based on a smoothness measure of the mesh and a constraint bounding the adjustment for each point.

16. The non-transitory computer readable medium of claim 15, wherein the computer executable instructions defining the step of generating a mesh representing the LV endocardium surface comprise computer executable instructions defining the steps of:

segmenting at least an initial LV endocardium surface and an LV epicardium surface in the 3D cardiac volume;

extracting an LV blood pool based on an optimal threshold determined based on intensities of voxels within the initial LV endocardium surface and voxels between the initial LV endocardium surface and the LV epicardium surface; and adjusting the initial LV endocardium surface to fit a boundary of the LV blood pool.

17. The non-transitory computer readable medium of claim 15, wherein the constraint bounding the adjustment for each point prevents the optimal adjustment for each point of the mesh from being inward towards the blood pool.

18. The non-transitory computer readable medium of claim 15, wherein the computer executable instructions defining the step of generating a smoothed mesh by smoothing the mesh by determining an optimal adjustment for each point on the mesh based on a smoothness measure of the mesh and a constraint bounding the adjustment for each point comprise computer executable instructions defining the step of:

minimizing an objective function based at least on the smoothness measure of the mesh subject to the constraint bounding the adjustment for each point.

19. The non-transitory computer readable medium of claim 18, wherein the objective function comprises a first term representing the smoothness measure and a second term that penalizes large adjustments.

20. The non-transitory computer readable medium of claim 15, wherein the optimal adjustment is constrained to be in a normal direction to the mesh.

* * * * *